United States Patent [19]

Ishida et al.

[11] Patent Number: 4,893,521
[45] Date of Patent: Jan. 16, 1990

[54] STEERING WHEEL

[75] Inventors: Syuichi Ishida, Ichinomiya; Shinichi Goto, Nagoya; Kimio Muramatsu, Okazaki, all of Japan

[73] Assignee: Toyoda Gosei Co., Ltd., Nishikasugai, Japan

[21] Appl. No.: 271,387

[22] Filed: Nov. 14, 1988

[30] Foreign Application Priority Data

Feb. 14, 1986 [JP] Japan ................................. 61-031581
Feb. 14, 1986 [JP] Japan ................................. 61-031582

[51] Int. Cl.⁴ .............................................. B62D 1/06
[52] U.S. Cl. ...................... 74/552; 280/750; 74/558.5
[58] Field of Search .................. 74/552-558.5; 280/777, 778, 731, 750; 29/159 B; 70/252

[56] References Cited

U.S. PATENT DOCUMENTS

| 3,823,618 | 7/1974 | Broyer | 74/552 |
|---|---|---|---|
| 3,825,360 | 7/1974 | Galich | 403/319 |
| 4,612,425 | 9/1986 | Kanai et al. | 74/552 |

FOREIGN PATENT DOCUMENTS

| 2359698 | 6/1975 | Fed. Rep. of Germany | 74/552 |
|---|---|---|---|
| 2497485 | 7/1982 | France | 74/552 |
| 0126760 | 8/1982 | Japan | 74/552 |
| 0026673 | 2/1983 | Japan | 74/552 |
| 0053561 | 3/1983 | Japan | 74/552 |
| 58-135363 | 9/1983 | Japan | 74/552 |
| 0187649 | 8/1987 | Japan | 74/552 |
| 0187650 | 8/1987 | Japan | 74/552 |
| 7606497 | 12/1977 | Netherlands | 74/552 |
| 1125490 | 8/1968 | United Kingdom | 74/552 |
| 1323209 | 7/1973 | United Kingdom | 74/552 |
| 1571902 | 7/1980 | United Kingdom | 74/552 |

*Primary Examiner*—Vinh Luong
*Attorney, Agent, or Firm*—Cushman, Darby & Cushman

[57] ABSTRACT

A steering wheel having an operating portion, a hub portion, a spoke portion, an impact energy absorbing member located on the hub portion for absorbing impact energy, and a pad including a hard insert and a soft cover member integrally covering the insert for covering at least an impact energy absorbing member and a spoke portion. The insert has a plurality of divided parts or a portion or portions of thin wall section to improve an impact energy absorbing effect of the impact energy absorbing member independently of the rigidity of the pad, without the deterioration of the pad.

13 Claims, 4 Drawing Sheets

STEERING WHEEL

This is a continuation of application Ser. No. 07/014,616filed Feb. 13, 1987, now abandoned.

BACKGROUND OF THE INVENTION

1. Field of the Invention

This invention relates to a steering wheel, and more particularly to improvements in a pad of a steering wheel for further improving an impact energy absorbing effect of an impact energy absorbing member (hereinafter referred to as an E/A member).

2. Description of the Prior Art

It has been already proposed to mount a member for absorbing impact energy, that is, what is called an E/A member, on a steering wheel. For example, a steering wheel is disclosed, in Japanese utility model laid-open No. 58-135363 published on Dec. 9, 1983. This steering wheel includes, as shown in FIG. 11, an E/A member 100 located on a hub portion thereof, and a pad 200 which covers the E/A member 100. The E/A member 100 is able to collapse to absorb impact energy. The pad 200 includes hard insert 201 and a soft cover member 202 integrally covering the insert 201.

Recently, a pad of such a large size that it covers not only a hub portion but also a spoke portion connecting hub portion and an operating portion. is desired from a view point of mechanical design. If a pad of such a large size is applied to a steering wheel on which an E/A member is mounted, it will be assembled in a state as shown in FIG. 12. In particular, an E/A member 100 which collapses to absorb impact energy is disposed on a hub portion of a steering wheel in a similar manner as in a conventional arrangement, and a pad 200 for covering the hub portion and a spoke portion of the steering wheel is mounted, for example, by way of a metal plate 101 mounted on the E/A member 100. If the rigidity of the insert 201 is low, the impact energy may readily be transmitted to the E/A member 100. However, in this case, the shape-maintaining property of the pad 200 tends to be decreased. Therefore, the insert 201 requires high rigidity.

Such a steering wheel as described above is advantageous in that it is good in shape-maintaining property of the pad 200. However, if an impact is applied just to an E/A member 100, a reactive force will be produced due to the rigidity of the pad 200 itself, and impact energy may sometimes be received by a spoke portion. Accordingly, a disadvantage may appear that the impact energy may not readily be transmitted to the E/A member 100 and hence the impact energy absorbing effect of the E/A member 100 will be deteriorated accordingly.

Accordingly, in designing the strength of an E/A member, the rigidity of the pad must be taken into consideration, and hence an increased number of man-hour is required.

SUMMARY OF THE INVENTION

The present invention has been made in consideration of such problems as described above, and it is an object of the invention to provide a steering wheel wherein the strength of an E/A member can be determined almost independently of the rigidity of the pad and it is good in the shape maintaining property of the pad.

Briefly, those objects and other objects of the present invention as hereinafter will become more readily apparent can be attained by a steering wheel as described hereinafter.

According to one aspect of the present invention, a steering wheel is provided comprising an operating portion, a hub portion contiguous to the operating portion for transmitting a motion of the operating portion to a steering shaft, a spoke portion for connecting the operating portion and the hub portion, an E/A member located on the hub portion for absorbing impact energy, and a pad including a hard insert and a soft cover member integrally covering the insert for covering at least the E/A member and the spoke portion: The insert is composed of a plurality of divided parts and the pad can be bent at a dividing portion or portions at which divided parts are divided from each other.

According to another aspect of the invention, the insert has a portion or portions of thin wall section and can be bent at the thin wall section portion or portions thereof.

A steering wheel according to the present invention has an operating portion, a hub portion, a spoke portion, an E/A member, and a pad. The operating portion is a portion which is operated by a driver to change the running direction of a vehicle and is a member in the form of a ring commonly called a rim or a ring portion. Various shapes including a circular shape and an elliptical shape are available for the shape of the operating portion, and the operating portion can be of any conventional type. Further, any of the materials, synthetic resin etc., for example, used for constructing the operating portions of conventional steering wheels can be used for the operating portion of the steering wheel of the present invention.

The hub portion is a portion which transmits the motion of the operating portion to a steering shaft and is generally located at the center of the operating portion. It is to be noted that a horn switch may be provided on the hub portion. The operating portion and the hub portion are interconnected by a spoke portion which generally extends radially from the hub portion.

The E/A member is a member for absorbing impact energy, and, for example, a member made of metal plate which can collapse to absorb impact energy may be employed as the E/A member.

The pad is composed of a hard insert and a soft cover member and covers at least the E/A member and the spoke portion. The insert is provided to maintain the shape of the pad and may be formed from a hard resin material or a metal plate as in conventional arrangements.

One of characteristics of the present invention resides in that the insert is composed of a plurality of divided parts. In particular, the pad can be bent at a dividing portion or portions at which the divided parts are divided from each other.

In such a case wherein the insert is first mounted on the E/A member and then the cover member is assembled to cover the insert, a gap may be provided between adjacent ones of the divided parts which are divided at the dividing portion or portions. However, in such a case wherein the insert is put into a metal mold in order to form a cover member by insert molding, it is desirable to engage adjacent ones of the divided parts with each other. This is because if the insert should have a gap, the flatness and smoothness of the pad may be deteriorated at a portion thereof corresponding to the gap.

It is also preferable to provide the divided parts with engaging portions for mechanical engagement with each other. Various constructions are available for the engaging portions: for example, the engaging portions may have comb-shaped profiles for meshing engagement with each other or else a hole or holes formed in one of adjacent ones of the divided parts and projection or projections formed on the other divided part for engagement with the hole or holes. By this construction, the flatness and smoothness of the surface of the pad can be maintained without increasing the rigidity of the entire pad, and precise positioning of the insert can be assured and relative movement of the individual divided parts of the insert in a horizontal direction can be prevented by engagement of the engaging portions of the divided parts.

Further, preferably the divided parts of the insert are mounted individually on the E/A member. By this construction, the shape-maintaining property of the pad can be further improved because even if the pad should be distorted by the dividing portion or portions of the insert, such distortion will be corrected by the E/A member.

Another characteristic of the invention resides in that the insert has at a predetermined position or positions thereof a thin wall sectioning portion or portions of thin wall section each in the form of a grooved thin wall portion, a plurality of successive through holes located at a predetermined distance from one another, or the like. Accordingly, the pad can be bent at the thin wall portion or portions thereof.

The thin wall portion or portions can each be, for example, in the form of successive grooves of a thin wall, successive recesses or successive through-holes formed at a predetermined distance from one another, or a portion defining an internal spacing within the insert. Alternatively, the thin wall portion or portions may each be a combination of a plurality of successive through-holes and grooved thin wall portions, or a like combination.

In a case wherein the insert is first mounted on the E/A member and then the cover member is assembled to cover the insert, a plurality of successive through-holes may be provided. However, in a case wherein the insert is put into a metal mold in order to form a cover member by insert molding, a surface of the insert to oppose to the cover member is preferably flat and smooth and hence the thin wall portion or portions are preferably provided such that they may not extend to a face of the insert opposite to the cover member. This is because presence of grooves or openings of through-holes at the face of the insert to oppose the cover member may deteriorate the flatness and smoothness of the cover member.

Individual sections provided with the thin wall portion or portions of the insert are preferably mounted individually on the E/A member. By this construction, the shape-maintaining property of the pad is further improved because even if the pad should be distorted at the thin wall portion or portions thereof, such distortion will be corrected by the E/A member.

Generally, the insert is entirely covered by the cover member. The cover member can be formed from a soft resin material such as soft polyvinyl chloride resin and polyurethane resin similarly to conventional cover members and can cover the insert by insert molding in integral relationship with the insert or by putting it on the insert after it has been made.

According to a steering wheel of the present invention, an insert of a pad is either composed of a plurality of divided parts or provided with a thin wall portion or portions formed at a predetermined position or positions of the insert. Thus, the pad can be bent at each dividing portion or thin wall portion of the insert, and hence the rigidity of the pad can be reduced significantly comparing with any other portion of the same. Accordingly, by forming the dividing portion or portions or the thin wall portion or portions, energy of impact is transmitted assuredly to the E/A member without being received by a section of the insert which covers a spoke portion. In this manner, impact energy is absorbed by an energy absorbing action of the E/A member (If a metal plate is used for the E/A member, impact energy is absorbed by buckling of the E/A member). However, it is almost unnecessary to determine a preset value for energy absorption of the E/A member in consideration of rigidity of the pad, and hence the number of man-hours required for designing can be reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Having generally described this invention, a further understanding can be obtained by reference to certain specific examples which are provided herein for purposes of illustration only and are not intended to be limiting unless otherwise specified.

EXAMPLE 1

A steering wheel according to an embodiment of the present invention is shown in FIGS. 1 to 4. The steering wheel shown is mainly composed of a hub portion 1 connected to a steering shaft, spoke portions 2 extending in a T-shape from the hub portion 1, and an annular ring portion 3 interconnecting the other ends of the spoke portions 2 and serving as an operating portion.

Figure 1:
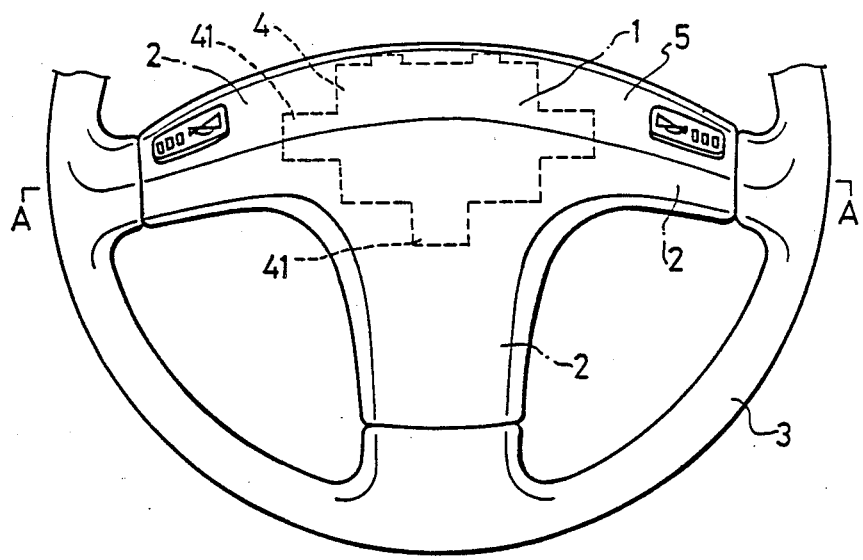
FIGS. 1 to 5 show a steering wheel of an embodiment of the present invention, and FIG. 1 being a plan view of an essential part of the steering wheel, Fig. 2 a cross-sectional view of an essential part of the steering wheel taken along line A—A of FIG. 1, FIG. 3 a schematic plan view of a pad, FIG. 4 an enlarged perspective view of an essential part of an insert, and FIG. 5 an enlarged perspective view of an essential part showing a engaging portion of a divided part of an insert of a modified form.
Figure 2:
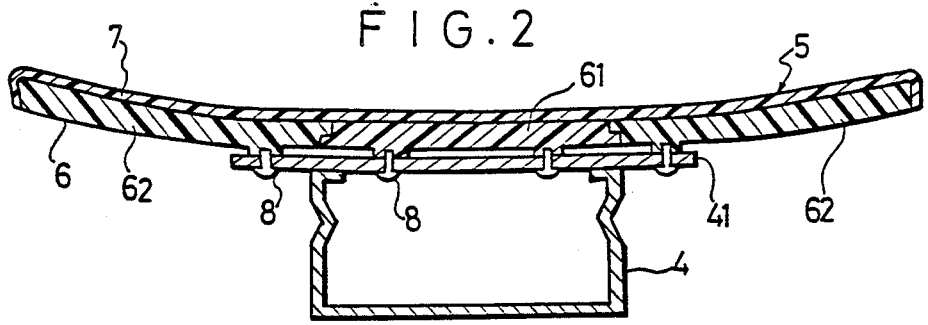

The hub portion 1 has, as shown in FIG. 2, an E/A member 4 formed from a metal plate, which is able to collapse to absorb impact energy, and a metal plate 41 which extends among base end portions of the spoke portions 2.

A pad 5 for covering the hub portion 1 and the spoke portions 2 is mounted on upper faces of the E/A member 4 and the metal plate 41.

The pad 5 is composed of an insert 6 made of a polypropylene resin material, and a cover member 7 made of a soft polyvinyl chloride resin material and formed in an integral relationship with the insert 6 by insert molding for covering the insert 6.

Figure 3:
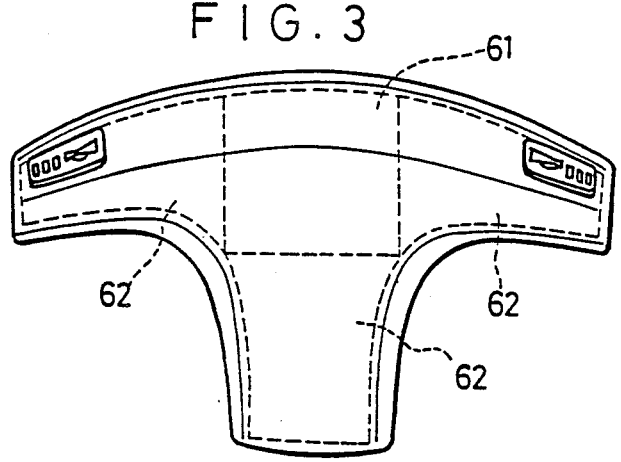
Figure 4:
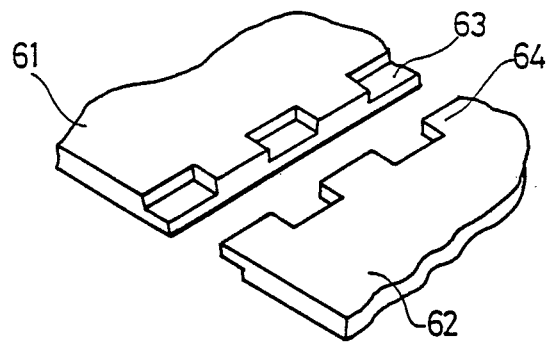

The insert 6 is divided into four parts including a main part 61 for covering the hub portion 1, and three wing parts 62 for covering the spoke portions 2, as schematically shown in FIG. 3. Each of the divided parts has recesses 63 and projections 64 formed thereon as shown in FIG. 4, and the divided parts are contacted with each other with the recesses 63 and the projections 64 thereof engaged with each other. The divided parts are mounted on the E/A member 4 and the metal plate 41 each by means of a rivet 8.

In the steering wheel of the present embodiment having the construction described above, if an impact force is applied to the main part 61, the pad 5 will be bent at each dividing portion thereof. Accordingly, the impact energy is transmitted assuredly to the E/A member 4 without being influenced by the rigidity of the wing parts 62 of the insert 6 and will thus be absorbed by collapsing motion of the E/A member 4.

Meanwhile, since the divided parts of the insert 6 are each mounted on the E/A member 4 and the metal plate 41, the shape of the pad is maintained assuredly. Further, since the divided parts of the insert 6 are contacted with each other with the recesses 63 and the projections 64 thereof engaged with each other, the insert 6 can be positioned readily when the cover member is to be molded, and since a continuous surface is provided by the divided parts of the insert 6, such a disadvantage that the flatness and smoothness of the cover member are deteriorated when the cover member is molded can be eliminated.

Figure 5:
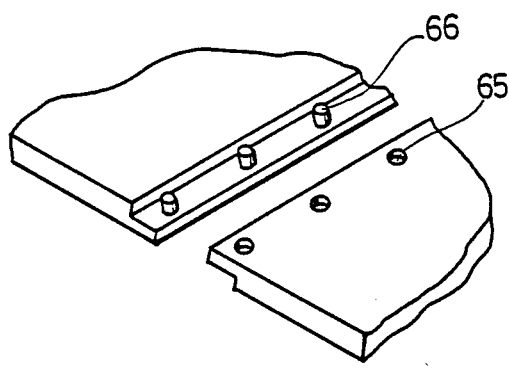

It is to be noted that engagement of the divided parts of the insert can be attained from various constructions. For example, as shown in FIG. 5, projections 66 provided on one of the divided parts of an insert may be fitted in holes 65 provided in another one of the divided parts of the insert.

EXAMPLE 2

The present embodiment is similar to the embodiment 1 except that construction of an insert is different, and like components or parts are denoted by like reference numerals to those of the example 1.

Figure 6:
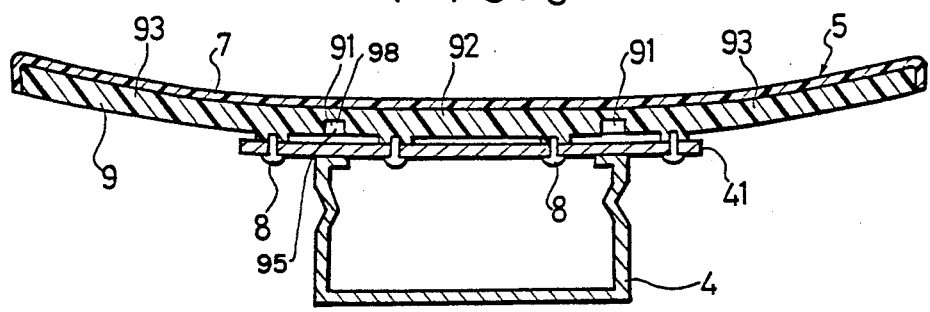
FIGS. 6 to 10 show a steering wheel of another embodiment of the invention, and FIG. 6 being a cross sectional view, similar to FIG. 2, of an essential part of the steering wheel, FIG. 7 a schematic plan view of a pad, and FIGS. 8, 9 and 10 being enlarged perspective views of essential part showing thin wall portions of an insert in different forms.
Figure 7:
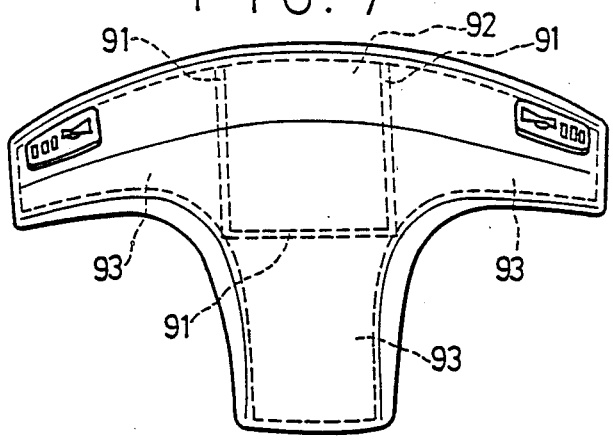

As schematically shown in FIGS. 6 and 7, three thin wall portions 91 constituted from recessed grooves are formed on the surface of an insert 9 opposing to and extending along an outer periphery of the E/A member 4. The thin wall portions 91 section the insert 9 into four parts including a main part 92 for covering the hub portion 1, and three wing parts 93 for covering the three spoke portions 2. The individual sections sectioned in this manner are each mounted on the E/A member 4 and the metal plate 41 by means of a rivet 8.

In the steering wheel of the present embodiment having the construction described above, if an impact force is applied to the main part 92, the pad 5 will be bent at the thin wall portion 91 thereof. Accordingly, the impact energy is transmitted assuredly to the E/A member 4 without being influenced by rigidity of the wing parts 93 and is thus absorbed by a collapsing motion of the E/A member 4.

Meanwhile, since the main part 92 and the wing parts 93 are each mounted on the E/A member 4 and the metal plate 41, the shape of the pad 5 can be maintained assuredly. Further, the surface of the insert 9 opposing to the cover member 7 is flat and smooth, and accordingly the surface of the cover member 7 is also flat and smooth.

Figure 8:
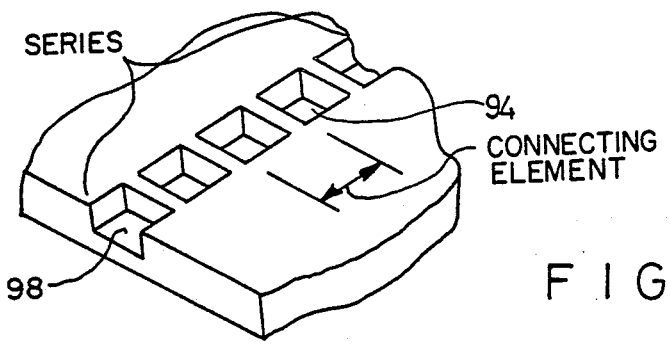

It is to be noted that the thin wall portion can be made in any other form than that of the embodiment described above. For example, the thin wall portion may be a plurality of recesses 94 formed in a predetermined spaced relationship from each other as shown in FIG. 8, or such an internal space 95 as shown in FIG. 9, or else a series of alternate arrangement of thin wall portions 96 in the form of bridges and penetrating through holes 97 as shown in FIG. 10.

Thus, in the embodiment shown in FIGS. 1–5, the joints between the parts of the hard insert are lap joints when a thinner edge portion on one part is lapped with a thinner edge portion on an adjacent part. In the FIG. 4 version, these edge parts are shown being of complementary tongue and groove form, for fitting one in the other, and in the FIG. 5 version, pins on the one edge portion are shown in position to be received in corresponding openings in the other edge portion.

Figure 9:
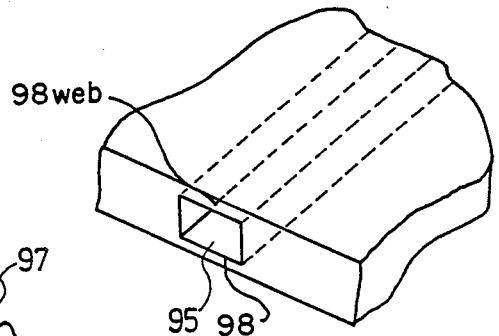
Figure 10:
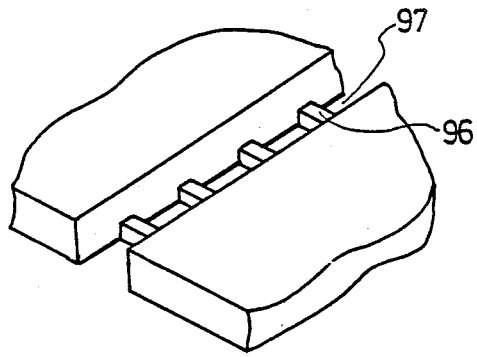
Figure 11:
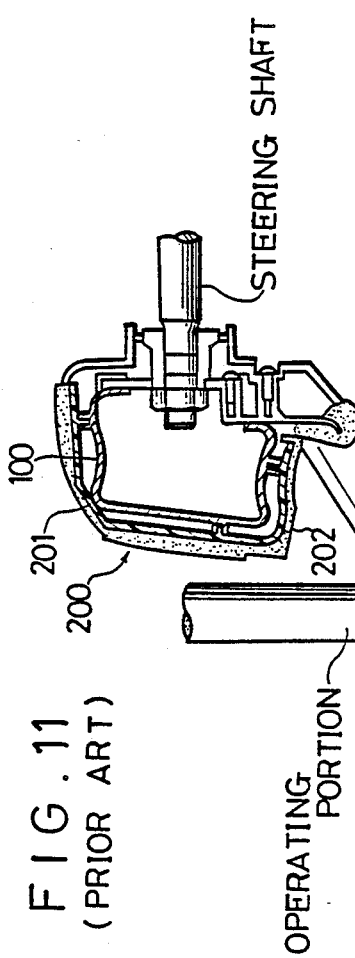
FIG. 11 is a schematic cross-sectional view of an essential part of a conventional steering wheel.
Figure 12:
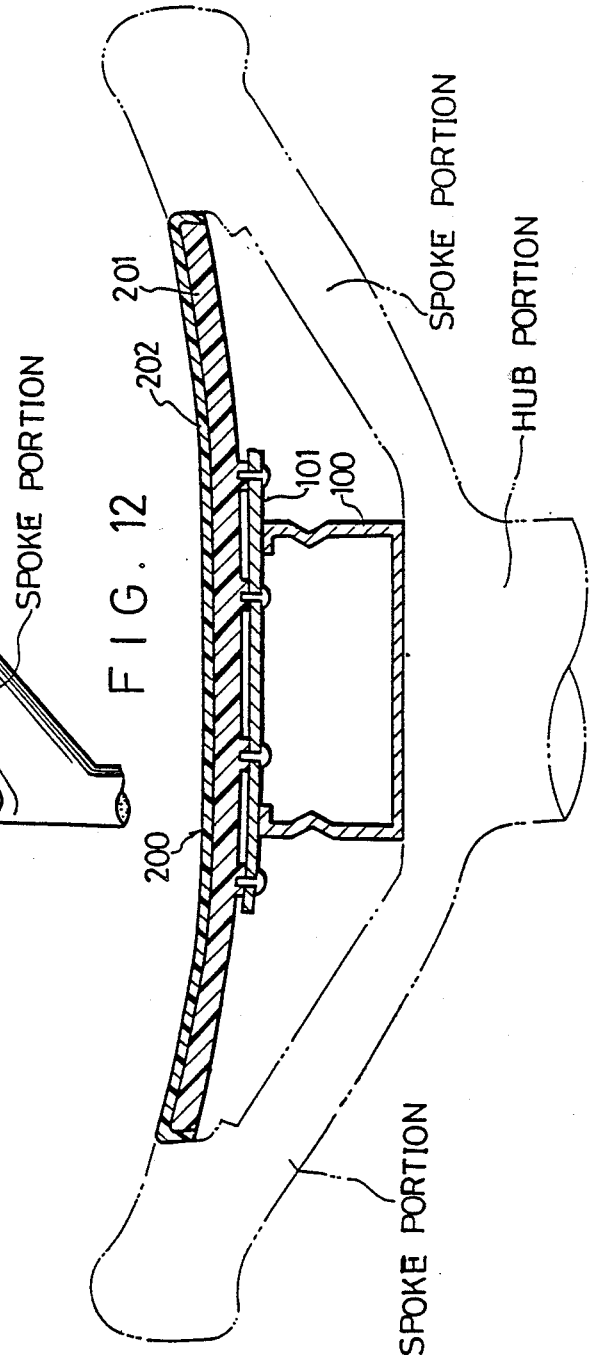
FIG. 12 is a cross-sectional view of an essential part of an imaginary steering wheel having a large size of pad.

In the embodiment shown in FIGS. 6—10, the parts of the hard insert remain integral where they connect. The connections are either provided as a series of several thin elements spaced by thicker elements (FIG. 8), a series of several thin elements spaced by openings (FIG. 10), or as a web-spaced-web construction running along the joint (FIG. 9).

In FIG. 6 and 9, the elements of the web-space-web structure are numbered 98, 95 and 98, respectively. In FIG. 10, the thin elements are numbered 96 and the openings are numbered 97.

The embodiments share the common concept that the joints (63, 64 in FIG. 4; 65, 66 in FIG. 5; or bendable portions at 94 in FIG. 8; at 95 in FIG. 9; and at 96, 97 in FIG. 10) provide lines along which the respective hard inserts are preferentially bendable when a force impacts the soft cover 7.

Having now fully described the invention, it will be apparent to one of ordinary skill in the art that many changes and modifications can be made thereto without departing from the spirit or scope of the invention as set forth herein.

What is claimed is:

1. A steering wheel comprising:
    an operating portion;
    a hub portion for connection with a steering shaft, said hub portion being located generally centrally of said operating portion;
    a spoke portion connecting said operating portion to said hub position for transmitting steering motion applied to said operating portion, to the steering shaft via the spoke portion and the hub portion;
    an impact energy absorbing member located on said hub portion for absorbing impact energy;

a pad covering said impact energy absorbing member and said spoke portion, said pad including a hard insert integrally covered by a soft cover member, said hard insert comprising a plurality of separate hard insert parts which are divided from one another by at least one bendable portion each of which provides a line of preferential bendability, whereby said pad can be bent when a force impacts said soft cover member, by causing bending movement of said parts along at least one said line of preferential bendability 2. The steering wheel of claim 1, further including:
fastener means securing each said hard insert part to said impact energy absorbing member.

3. The steering wheel of claim 2, wherein:
said hard insert parts include a centrally-located hard insert part and a plurality of peripherally-located hard insert parts, and said peripherally-located hard insert parts each having first portions bounded by said impact energy absorbing member, and second portions which project beyond said impact energy absorbing member and overly said spoke portion, at least a part of said at least one bendable portion thereby being bounded by said impact energy absorbing member.

4. The steering wheel of claim 3, wherein:
each said bendable portion comprises at least one connecting element having a thinner portion which is thinner than said hard insert parts and respective one of said hard insert parts are integrally joined by said at least one connecting element.

5. The steering wheel of claim 4, wherein:
each said bendable portion is constituted by a series of said connecting elements, each said thinner portion extending across said line of preferential bendability and being spaced from each other said thinner portion.

6. The steering wheel of claim 5, wherein:
said series of connecting elements further includes openings through said hard insert.

7. The steering wheel of claim 4, wherein:
each of said at least one connecting element is constituted by at least one continuous web adjoining a hollowed-out space.

8. The steering wheel of claim 7, wherein:
said at least one connecting element is further constituted by a second continuous web which is spaced from said one continuous web by said hollowed-out space.

9. The steering wheel of claim 1, wherein:
each said bendable portion comprises at least one connecting element, each said connecting element having a thinner portion which is thinner than said hard insert parts and respective ones of said hard insert parts are integrally joined by said at least one connecting element.

10. The steering wheel of claim 9, wherein:
said at least one bendable portion is constituted by a series of said connecting elements, each said thinner portion extending across said line of preferential bendability and being spaced from each other said thinner portion.

11. The steering wheel of claim 10, wherein:
said series of connecting elements further includes openings through said hard insert.

12. The steering wheel of claim 9, wherein:
each of said at least one connecting element is constituted by at least one continuous web adjoining a hollowed-out space.

13. The steering wheel of claim 12, wherein:
said at least one connecting element is further constituted by a second continuous web which is spaced from said one continuous web by said hollowed-out space.

* * * * *

UNITED STATES PATENT AND TRADEMARK OFFICE
CERTIFICATE OF CORRECTION

PATENT NO. : 4,893,521

DATED : January 16, 1990

INVENTOR(S) : Syuichi ISHIDA, Shinichi GOTO, Kimio MURAMATSU

It is certified that error appears in the above-identified patent and that said Letters Patent is hereby corrected as shown below:

Col. 1, line 19, change "Dec. 9" to -- Sept. 12 --;

line 27, change "a hub portion" to -- a hub portion, --;

line 28, change "an operating portion." to -- an operating portion, --.

Col. 2, line 12, change "spoke portion:" to -- spoke portion. --.

Col. 3, line 26, delete "thin wall sectioning".

Col. 4, line 34, change "Fig. 2" to -- FIG. 2 --;

line 43, change "cross" to -- cross- --.

Col. 6, line 27, change "when" to -- where --;

line 39, delete "as", change "web-spaced-web" to -- web-space-web --;

line 41, change "FIG." to -- FIGS. --;

line 64, change "position" to -- portion --.

Signed and Sealed this

Twenty-eighth Day of May, 1991

Attest:

HARRY F. MANBECK, JR.

Attesting Officer

Commissioner of Patents and Trademarks